May 8, 1951   J. J. DUGAS   2,552,001
DUAL CONTROL FOR MARINE MOTORS
Filed Aug. 17, 1948   2 Sheets-Sheet 1

Inventor
Joseph J. Dugas
By Mason, Fenwick & Lawrence
ATTORNEYS

May 8, 1951          J. J. DUGAS          2,552,001
DUAL CONTROL FOR MARINE MOTORS
Filed Aug. 17, 1948          2 Sheets-Sheet 2
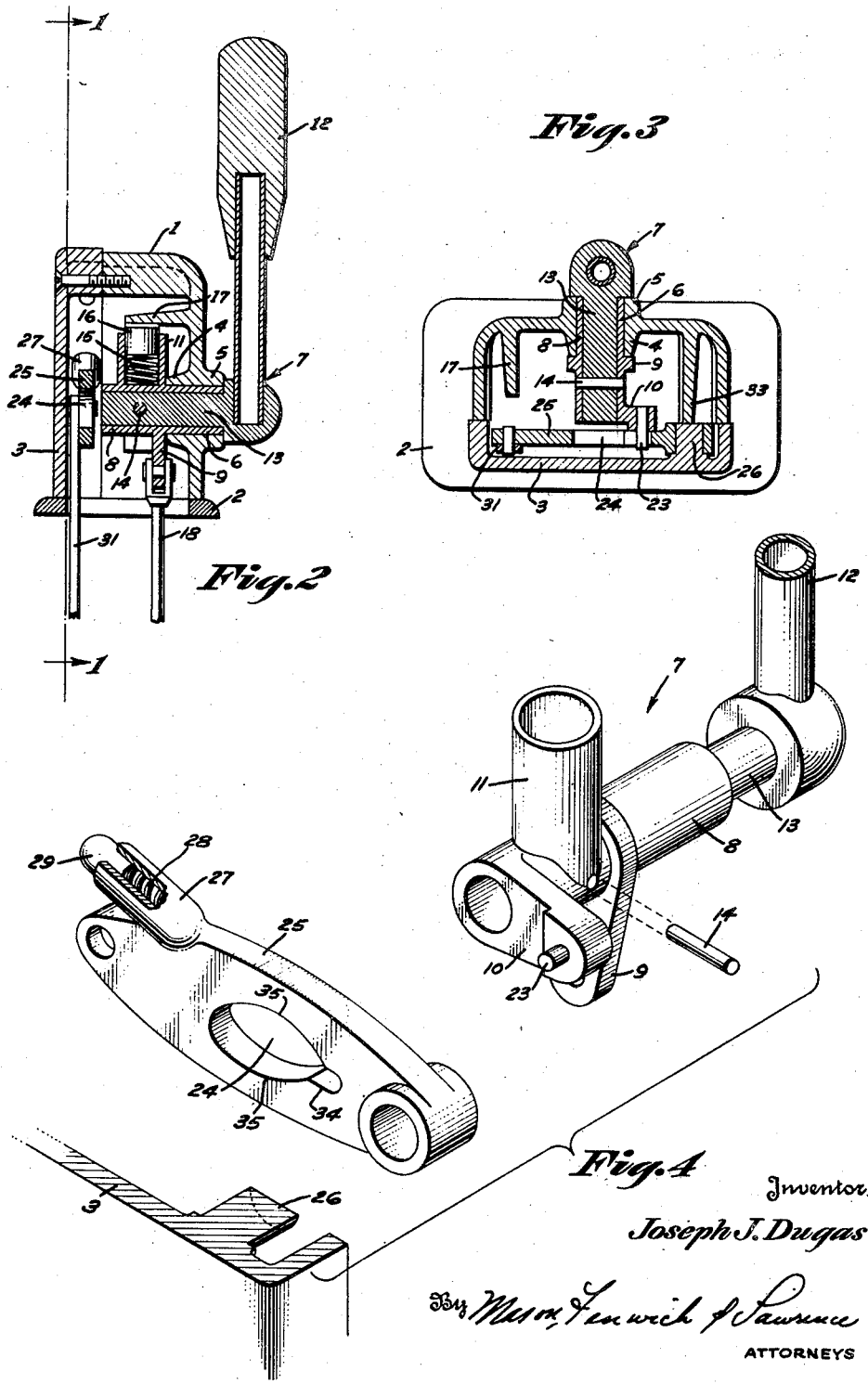
Inventor
Joseph J. Dugas
ATTORNEYS Patented May 8, 1951

2,552,001

UNITED STATES PATENT OFFICE 2,552,001

DUAL CONTROL FOR MARINE MOTORS

Joseph J. Dugas, Lacombe, La., assignor to Higgins Industries, Inc., New Orleans, La., a corporation of Louisiana Application August 17, 1948, Serial No. 44,705

10 Claims. (Cl. 192—.098)

This invention relates to dual controls for an internal combustion engine power plant, and more particularly to such a control wherein the manual operation of a throttle lever automatically controls the operation of a clutch, reverse gear, or transmission of the power plant to prevent the engine from racing when the clutch, reverse gear, or transmission is disengaged, and to prevent recoupling of the load with the engine occurring while the engine is operating at high speed.

It is, of course, well known that in a boat the reverse gear acts as a brake upon the forward speed of the boat, which to be effective has little or no gear reduction with respect to the forward speed. Frequently, to avoid a collision, it is necessary to throw the gear immediately from forward speed position to reverse speed position. During the transition, the clutch is thrown out, and ordinarily the engine races, imposing a strain upon the parts when the clutch and gears are re-engaged in reverse gear, particularly wearing the clutch unduly. Aside from such emergency operation, it is highly desirable whenever changing from forward to reverse, or vice versa, to ensure the throttle valve being closed to bring the engine to low speed when the clutch is about to be disengaged, so that the engine will not be racing when thrown into the opposite gear.

The object of the present invention is to provide a control to meet these conditions, wherein a manually operated throttle lever is utilized to control the operation of the clutch, reverse gear, or transmission of the engine, and a transition from full engine speed in one direction to full engine speed in the opposite direction may be accomplished by a single uni-directional movement of the throttle lever, with the throttle valve being closed during the disengagement and re-engagement of the clutch, reverse gear, or transmission.

A further object of the invention is to provide such a control having full range of throttle movement from fully closed to fully open positions without disturbing the position of the clutch, reverse gear, or transmission.

Other objects will become apparent from the following description of one embodiment of the invention, when taken in conjunction with the drawings which accompany and form a part of this specification.

In the drawings:

Figure 2 is a vertical section through the control taken on the line 2—2 of Figure 1;

Figure 3 is a horizontal section through the control taken on the line 3—3 of Figure 1; and, Figure 4 is an exploded perspective view of the principal operating parts of the control and a portion of the housing cover.

Figure 1:
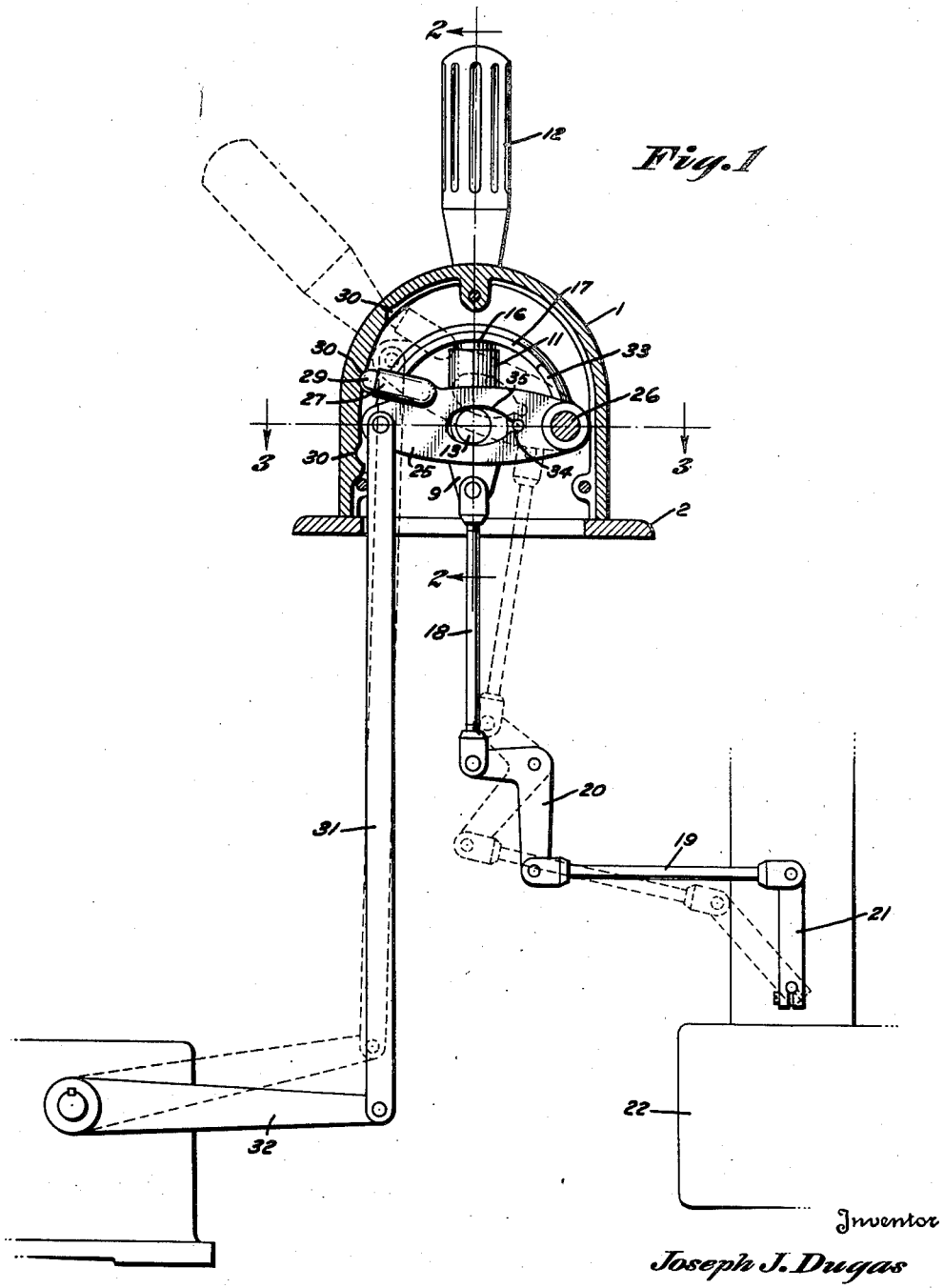
Figure 1 is a vertical section through a device embodying the principles of the present invention, and is taken substantially on the line 1—1 of Figure 2 showing a manner of connecting the control to a carburetor valve lever and clutch control lever.

It will be understood that the control unit of the present invention is designed to operate the throttle valve of an internal combustion engine and, in addition, the clutch, reverse gear or transmission as the case may be. Although the control can operate the clutch, reverse gear or transmission with equal facility, for purposes of simplification the unit controlled will be referred to herein as a clutch.

Referring to the drawings in detail, the operating portions of the control are encased within a housing 1 which seats upon a base 2 and has a cover plate 3. The housing, base, and cover plate are fastened together by screws, or other securing means, to form a unitary structure.

Housing 1 is formed with internal and external axially aligned bosses 4 and 5 through which an opening 6 extends to rotatably receive the shaft of the throttle control member 7.

The throttle control is shown as a unitary casting comprising a tubular shaft 8, a throttle lever 9, a clutch lever actuating arm 10 and a spring brake housing 11. The clutch lever actuating arm is positioned at one end of the shaft 8 and the throttle lever at an intermediate point, with the brake housing being positioned between the throttle lever and clutch lever actuating arm. The throttle lever and brake housing are diametrically opposed with respect to the shaft 8, and the clutch lever actuating arm is perpendicular to that diameter.

A handle 12 and shaft 13 form part of the throttle control assembly, shaft 13 being inserted within tubular shaft 8 and being fastened thereto by means of a pin 14 which extends through both shafts. In assembling the throttle control, the end of shaft 8 is slipped into the journal opening 6 from the inside of the housing while the cover plate is removed, and shaft 13 slipped into tubular shaft 8 from the outside of the housing and the two secured in place by inserting pin 14 through the diametrical openings provided in the two shafts. The enlarged head of the handle-shaft 13 abuts the end of boss 5, and the throttle lever 9 and brake housing 11 bear against the end of boss 4 to prevent movement of the assembly axially of the shafts.

The spring brake carried by housing 11 consists of a coiled spring 15 which seats within the housing 11 and a fiber brake block 16 which has a sliding fit within the housing 11 and rests upon the coiled spring 15. Brake block 16 bears against a substantially semi-circular brake flange 17 which extends from the inner wall of housing 1. The arc of brake flange 17 is struck from the axis of rotation of the throttle control assembly so that brake block 16 will bear with equal pressure upon flange 17 at all positions of movement of the throttle assembly to hold the assembly in any desired position.

Throttle lever 9 is connected to the throttle valve control lever on the carburetor in any desired manner, so long as the connection is such that movement of the lever 9 in opposite directions from a dead center point will impart movement to the carburetor control valve in one direction only. In other words, lever 9 is positioned vertically downward when the throttle is fully retarded, and moves in either a clockwise or counter-clockwise direction depending upon whether the boat is to be moved forward or in reverse. Either movement of lever 9 must produce a throttle-opening movement of the carburetor lever. As illustrated, the connection may take the form of a pair of links 18 and 19 connected to a bell-crank lever 20, link 18 connecting lever 9 to one arm of lever 20 and link 19 connecting the other arm of lever 20 to the throttle valve lever 21 on the carburetor 22. As lever 9 is in its fully retarded position as shown in full lines in Figure 1, it will be evident that movement of the lever in either direction will result in a throttle opening movement of carburetor lever 21.

The clutch lever actuating arm 10 is provided with a projecting pin 23 which moves in a cam opening 24 in the clutch lever 25 to move the clutch lever to actuate the clutch. Clutch lever 25 is rockably mounted upon a stud 26 which projects horizontally inward from the housing cover plate 3. Stud 26 is located near one side of the housing interior so that the clutch lever 25 may be of substantial length, and the cam opening 24 may be positioned intermediate the ends of the lever approximately in the region of the axis of the throttle assembly. Lever 25 is provided with an offset barrel 27 to receive a spring 28 and plunger 29 which cooperates with a series of detents 30 to hold the clutch lever in neutral, forward, or reverse positions. A link 31 connects the free end of lever 25 with a clutch arm 32. The brake flange 17, carried by the housing, is provided with an extension 33 opposite the stud 26 to prevent the clutch lever from slipping from the stud when the cover plate is in place upon the housing. The cam opening 24 is "eye-shaped," being substantially oval and having a reduced tail portion 34 which projects beyond one side of the oval portion along the long axis of the oval. Pin 23, carried by the clutch lever actuating arm 10, rests within the tail portion 34 of the cam opening when the throttle assembly is in fully retarded position and the clutch lever 25 is in neutral, or clutch disengaged position. This is the position shown in full lines in Figure 1, and it will be noted that the handle 12 and the throttle lever 9 are in a vertical position, while the clutch lever actuating arm 10 and the clutch lever 25 are horizontal.

Movement of the throttle handle 12 in either direction will cause first, engagement of the clutch, and second, opening of the throttle valve to increase the speed of the engine. If the handle 12 is moved in a counter-clockwise direction toward the position shown in dotted lines in Figure 1, the initial movement causes a counter-clockwise rotation of the entire throttle control assembly. Pin 23, carried by lever 10 and resting in the tail portion 34 of the cam opening in the clutch lever, will exert an upward pressure against the flat surface of the opening to rock the lever upward about its pivot stud 26, lifting the clutch link 31 and moving the clutch arm 32 to engage the clutch. As the clutch is engaged, spring pressed plunger 29 will seat in the uppermost detent to hold the clutch lever against accidental movement. At the instant the clutch lever arrives in this position, pin 23 will be leaving the tail portion 34 of the cam opening and be at the juncture of the surface of the tail portion and the flattened curve 35 of the larger oval section. This arc of the opening is struck from the axis of the throttle control assembly with the clutch lever 25 in clutch-engaged position, or as shown in dotted lines in Figure 1. Consequently, further movement of the handle 12 will impart no further movement to the clutch lever 25 as the pin 23 will ride freely over the surface of the cam-arc 35. Therefore, the throttle may be advanced or retarded at will without causing disengagement of the clutch.

It will be noted that the throttle lever 9 begins its movement from a vertical position, so that initial movement of the lever in either direction is on that portion of its arc of travel which has the least lift, or gives the least movement to the linkage connecting it to the carburetor. Clutch lever actuating arm 10, on the other hand, being horizontal, has its initial movement on that portion of its arc of travel which will give the clutch lever 25 the greatest movement for the least travel of the handle 12. Consequently, a slight movement of the handle is sufficient to engage the clutch, but the throttle valve of the carburetor is given slight if any opening movement. As a result of this, clockwise movement of the handle 12, from the clutch-engaged position described above, will completely retard the throttle before the pin 23 again enters the tail portion 34 of the cam opening to disengage the clutch.

It will be obvious from the above that it is impossible to disengage the clutch with the engine racing. Even in an emergency shift from full throttle forward to full throttle reverse, when the handle 12 is quickly moved from one extreme position to the other, the engine is completely throttled down during the disengagement and subsequent re-engagement of the clutch.

The present invention accomplishes its purpose in an extremely simple manner, with identical movements in opposite directions causing the boat to move in opposite directions. The control may be so mounted that movement of the control handle will be in a plane parallel to the center line of the boat, so that movement of the handle in a forward direction will cause the boat to move forward and movement of the handle backward will cause the boat to move in reverse.

In the above there has been described one

What is claimed is:

1. In dual controls for internal combustion engines having a reversing clutch and a throttle valve, a throttle control assembly including an operating handle, a throttle lever, and a clutch lever actuating arm, pivotally mounted to be manually rocked to either side of a central plane, a clutch lever pivotally mounted at a point remote from said throttle assembly mounting for movement to either side of a neutral position, and a connection between said clutch lever actuating arm and said clutch lever comprising a pin and cam slot, said pin being carried by said clutch lever actuating arm and said cam slot being in said clutch lever, said cam slot including an enlarged opening and a communicating reduced tail portion, said throttle lever being connected by linkage to the throttle valve of said engine, and said clutch lever being coupled to the reversing gear of said engine, the throttle lever and clutch lever actuating arm being arranged at right angles to one another and the paths of movement of said throttle linkage and said clutch lever coupling means being substantially parallel.

2. In dual controls as set forth in claim 1, said throttle assembly being so oriented when in inoperative position as to place said throttle lever so that initial movement in either direction will move said throttle lever on that portion of its arc of travel which produces a minimum movement of its linkage.

3. In dual controls as set forth in claim 1, a friction brake carried by said throttle assembly to hold said assembly in positions of adjustment, and yieldable locking means to hold said clutch lever in said neutral position and in extreme positions on either side thereof.

4. In throttle controls for internal combustion engines having a reversing clutch and a throttle valve, a throttle control assembly including a central shaft and an operating handle, a throttle lever, and a clutch lever actuating arm all carried by said shaft, said shaft being journaled for rotation whereby said throttle control assembly may be manually rocked to either side of a central plane, a clutch lever pivotally mounted at a point remote from said throttle assembly shaft for movement to either side of a neutral position, said clutch lever when in neutral position extending across the projected axis of said throttle control shaft, a pin carried by said clutch lever actuating arm and a cam slot in said clutch lever to receive said pin, said cam slot including an enlarged opening and a communicating reduced portion with the pin resting in said tail portion when the clutch lever is in neutral position, said throttle lever and said clutch lever actuating arm being arranged at an angle of 90° to one another, said throttle lever being connected by linkage to the throttle valve of said engine, said clutch lever being coupled to the reversing clutch of said engine, and the paths of movement of said linkage and said coupling means being in substantially parallel planes.

5. In dual controls as set forth in claim 4, said throttle assembly being so oriented when in inoperative position as to place said throttle lever and said clutch lever in relation to the paths of movement of their respective linkage and coupling means so that initial rocking movement in either direction will produce a minimum movement of the throttle linkage and a maximum movement of the clutch coupling means.

6. In dual controls for internal combustion engines having a reversing clutch and a throttle valve, a housing and a cover plate, a throttle control assembly journaled in said housing for rocking movement to either side of a central plane, a clutch lever pivotally mounted on said cover plate for movement to either side of a neutral position, and a lost-motion connection between said throttle control assembly and said clutch lever, said housing having an arcuate brake flange and said throttle control assembly having a companion friction brake, said brake flange crossing the projected axis of the clutch lever pivot and having its edge adjacent the clutch lever to prevent the clutch lever moving axially of its pivot when the housing and cover plate are assembled.

7. In dual controls for internal combustion engines, having a reversing clutch and a throttle valve, a throttle control assembly pivotally mounted to be manually rocked to either side of a central plane, a clutch lever pivotally mounted for movement to either side of a neutral position, and a lost-motion connection between said throttle control assembly and said clutch lever such that initial movement of said throttle assembly to either side of said central plane will move said clutch lever from said neutral position, and movement of said throttle control assembly beyond said initial movement may be accomplished without further movement of said clutch lever, said throttle control assembly being connected by linkage to the throttle valve of said engine to control said valve, and said clutch lever being coupled to the reversing clutch of said engine, said lost-motion connection being a pin and cam slot, said pin being carried by said throttle control assembly, and said cam slot being in said clutch lever, said cam slot comprising an enlarged opening and a communicating reduced tail portion, and having its longitudinal axis extending longitudinally of the clutch lever.

8. In dual controls for internal combustion engines having a reversing clutch and a throttle valve, a throttle control assembly including an operating handle, a throttle lever, and a clutch lever actuating arm pivotally mounted to be manually rocked to either side of a central plane, a clutch lever pivotally mounted for movement to either side of a neutral position, and a lost-motion connection between said clutch lever actuating arm and said clutch lever such that initial movement of said operating handle to either side of said central plane will move said clutch lever from said neutral position, and movement of said operating handle beyond said initial movement may be accomplished without further movement of said clutch lever, said throttle lever being connected by linkage to the throttle valve of said engine, and said clutch lever being coupled to the reversing clutch of said engine, the relative positions of said throttle lever and its linkage, said clutch lever actuating arm, and said clutch lever and its coupling means being such that the said initial movement of said operating handle will cause the throttle lever to move on that portion of its arc of travel which will produce a minimum movement of its linkage, and the clutch lever actuating arm to move on that portion of its arc of travel which will produce a maximum movement of the clutch lever and its coupling means, said lost-motion connection being a pin and cam slot, said pin being carried by said clutch lever actuating arm, and said cam slot being in said clutch lever, said cam slot comprising an enlarged opening and a communicating reduced tail portion, and having its longitudinal axis extending longitudinally of the clutch lever.

9. In dual controls for internal combustion engines having a reversing clutch and a throttle valve, a throttle control assembly including an operating handle, a throttle lever, and a clutch lever actuating arm pivotally mounted to be manually rocked to either side of a central plane, a clutch lever pivotally mounted for movement to either side of a neutral position, and a lost-motion connection between said clutch lever actuating arm and said clutch lever such that initial movement of said operating handle to either side of said central plane will move said clutch lever from said neutral position, and movement of said operating handle beyond said initial movement may be accomplished without further movement of said clutch lever, said throttle lever being connected by linkage to the throttle valve of said engine, and said clutch lever being coupled to the reversing clutch of said engine, the relative positions of said throttle lever and its linkage, said clutch lever actuating arm, and said clutch lever and its coupling means being such that the said initial movement of said operating handle will cause the throttle lever to move on that portion of its arc of travel which will produce a minimum movement of its linkage, and the clutch lever actuating arm to move on that portion of its arc of travel which will produce a maximum movement of the clutch lever and its coupling means, a friction brake carried by said throttle assembly to hold said assembly in positions of adjustment, and yieldable locking means to hold said clutch lever in said neutral position and in extreme position on either side thereof.

10. In dual controls for internal combustion engines, having a reversing clutch and a throttle valve, a throttle control assembly pivotally mounted to be manually rocked to either side of a central plane, a clutch lever pivotally mounted for movement to either side of a neutral position, and a lost-motion connection between said throttle control assembly and said clutch lever such that initial movement of said throttle assembly to either side of said central plane will move said clutch lever from said neutral position, and movement of said throttle control assembly beyond said initial movement may be accomplished without further movement of said clutch lever, said throttle control assembly being connected by linkage to the throttle valve of said engine to control said valve, and said clutch lever being coupled to the reversing clutch of said engine, a friction brake carried by said throttle assembly to hold said assembly in positions of adjustment, and yieldable locking means to hold said clutch lever in said neutral position and in extreme positions on either side thereof.

JOSEPH J. DUGAS.

REFERENCES CITED

The following references are of record in the file of this patent:

UNITED STATES PATENTS

| Number | Name | Date |
|---|---|---|
| 1,667,842 | Coykendall | May 1, 1928 |
| 1,710,002 | Pearson | Apr. 23, 1929 |
| 2,254,144 | Higgins | Aug. 26, 1941 |
| 2,396,231 | Brill | Mar. 12, 1946 |
| 2,411,463 | Pozgay | Nov. 19, 1946 |